United States Patent [19]

Kitagaki et al.

[11] Patent Number: 4,858,004
[45] Date of Patent: Aug. 15, 1989

[54] CODER/DECODER FOR TIME COMPRESSED INTEGRATION SYSTEM

[75] Inventors: Kazukuni Kitagaki, Kawasaki; Takeshi Ohto, Yokohama, both of Japan

[73] Assignee: Kabushiki Kaisha Toshiba, Kawasaki, Japan

[21] Appl. No.: 146,188

[22] Filed: Jan. 20, 1988

[30] Foreign Application Priority Data

Jan. 21, 1987 [JP] Japan .................. 62-10093

[51] Int. Cl.$^4$ .................. H04N 7/12; H04N 11/20; H04N 9/79
[52] U.S. Cl. .................. 358/133; 358/330; 358/11; 358/21 R
[58] Field of Search .................. 358/11, 14, 21 R, 133, 358/310, 330

[56] References Cited

U.S. PATENT DOCUMENTS

| | | | |
|---|---|---|---|
| 4,630,099 | 12/1986 | Rzeszewski | 358/11 |
| 4,652,903 | 3/1987 | Lucas | 358/11 |
| 4,677,498 | 6/1987 | Tsushima | 358/310 |
| 4,692,801 | 9/1987 | Ninomiya et al. | 358/133 |
| 4,710,810 | 12/1987 | Koga | 358/133 |
| 4,739,390 | 4/1988 | Achiha et al. | 358/11 |
| 4,745,459 | 5/1988 | Ninomiya et al. | 358/12 |

FOREIGN PATENT DOCUMENTS

56-130808  10/1981  Japan .
60-133600   7/1985  Japan .
61-123267   6/1986  Japan .

Primary Examiner—James J. Groody
Assistant Examiner—John K. Peng
Attorney, Agent, or Firm—Oblon, Spivak, McClelland, Maier & Neustadt

[57] ABSTRACT

A coder/decoder for a time compressed integration system includes a coder for performing time compressed ingtegration of compressed wide- and narrow-width chrominance signals and a luminance signal having passed through a first phase compensation delay circuit and outputting a time compressed integration (TCI) signal, and a decoder for decoding the luminance signal and the chrominance signals from the TCI signal. The coder and the decoder are substantially arranged on a single LSI chip. The coder/decoder includes a first and a second memory section. In a coder mode, the first memory section serves as the first phase compensation delay circuit and part of the second memory section serves as the tapped delay devices in the vertical filters. In a decoder mode, the first memory section and one part of the second memory section serve as a second phase compensation delay circuit, and the other part of the second memory section serves as a tapped delay device in an interpolation filter.

9 Claims, 6 Drawing Sheets

CODER/DECODER FOR TIME COMPRESSED INTEGRATION SYSTEM

BACKGROUND OF THE INVENTION

The present invention relates to a coder/decoder for transmitting a television (TV) signal using a time compressed integration system and, more particularly, to a coder/decoder for a time compressed integration system, wherein the coder and decoder sections are arranged on a single IC chip and the coder/decoder is selectively used as a coder or decoder.

A time compressed integration (TCI) system is proposed as one of the TV signal transmission systems. In a TCI system, color video information is transmitted as a luminance signal (the Y signal) and two chrominance signals, i.e., a wide-band chrominance signal (to be referred to as a $C_W$ signal hereinafter) and a narrowband chrominance signal (to be referred to as a $C_N$ signal hereinafter). The TCI system utilizes the fact that the bands of the $C_W$ and $C_N$ signals require only about ¼ the band of the Y signal when human visibility is taken into consideration. The $C_W$ and $C_N$ signals are time-compressed and are inserted in the horizontal flyback period of the TV signal, thereby transmitting the Y, $C_W$, and $C_N$ signals after time compressed integration.

Figures 1A, 1B, 1C:
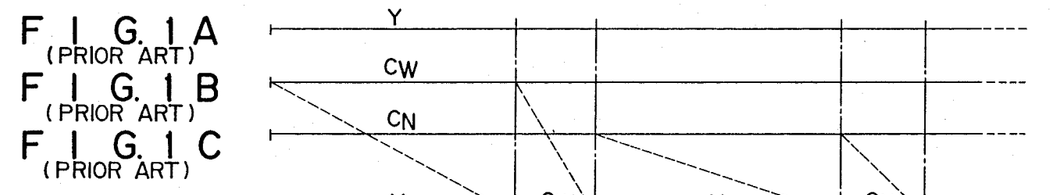
FIGS. 1A to 1D are timing charts for explaining a TCI signal format.

A TCI signal format will be described in detail with reference to FIGS. 1A to 1D. Image information picked up by a TV camera is extracted as R (red), G (green), and B (blue) signals, i.e., the primary color signals from the TV camera. The R, G, and B signals are converted into the Y, $C_W$, and $C_N$ signals, as shown in FIGS. 1A, 1B, and 1C, respectively. The Y, $C_W$, and $C_N$ signals are simultaneously input to a coder called a TCI coder and are converted into time compressed integration signals (TCI signals). In an image reproduced on a TV set, of 1H (one horizontal scanning period) signals, only signals of about 80% horizontal scanning period A excluding the horizontal flyback period are used in practice. In the TCI system, the signals in horizontal flyback period B are excluded from the Y, $C_W$, and $C_N$ signals, and only signals in effective horizontal scanning period A are extracted. In a practical application of the TCI system, 1,536 luminance signal data as the Y signal, 384 wide-band chrominance signal as the $C_W$ signal, and 384 narrow-band chrominance signal as the $C_N$ signal are included as digital signals. The $C_W$ and $C_N$ signals within effective horizontal scanning period A are time-compressed and are inserted in horizontal flyback period B of the Y signal, thereby producing the TCI signal shown in FIG. 1D.

The initial bands of the $C_W$ and $C_N$ signals are about ¼ the band of the Y signal. It is easy to time-compress these signals into those having the same band as that of the Y signal. Therefore, the TCI signal having a one-channel transmission band can be transmitted onto a transmission line. In the TCI system, the $C_W$ and $C_N$ signals are alternately extracted every 1H. In other words, the $C_W$ and $C_N$ signals are alternately inserted in horizontal flyback period B. Alternate insertion of the $C_W$ and $C_N$ signals every 1H in the TCI system is based on the following reason. In order to insert the $C_W$ and $C_N$ signals into horizontal flyback period B of the same 1H, horizontal flyback period B is not long enough. In order to insert all the $C_W$, $C_N$, and Y signals within the same 1H, even the Y signal must be time-compressed and the transmission band of the TCI signal is undesirably increased.

In the TCI system for inserting the $C_W$ and $C_N$ signals in each horizontal flyback period B in accordance with a line sequential scheme, the $C_W$ or $C_N$ signal is processed as if it is sampled at a ½ sampling rate of the horizontal scanning frequency in the vertical direction. The band of the TV signal in the vertical direction is a ½ frequency of the horizontal scanning frequency, i.e., (½)×(Number of Lines Per Frame). For this reason, the band of the $C_W$ and $C_N$ signals in the vertical direction must be limited below ¼ (the number of lines per frame) prior to time compression so as to prevent the folded component caused by sampling in the TCI coder from being mixed in the transmission band. A low-pass filter used for such band limitation is called a vertical filter.

Figure 1D:
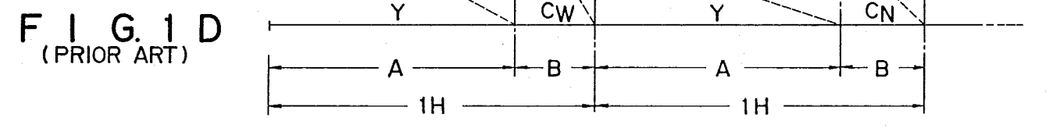
Figure 2:
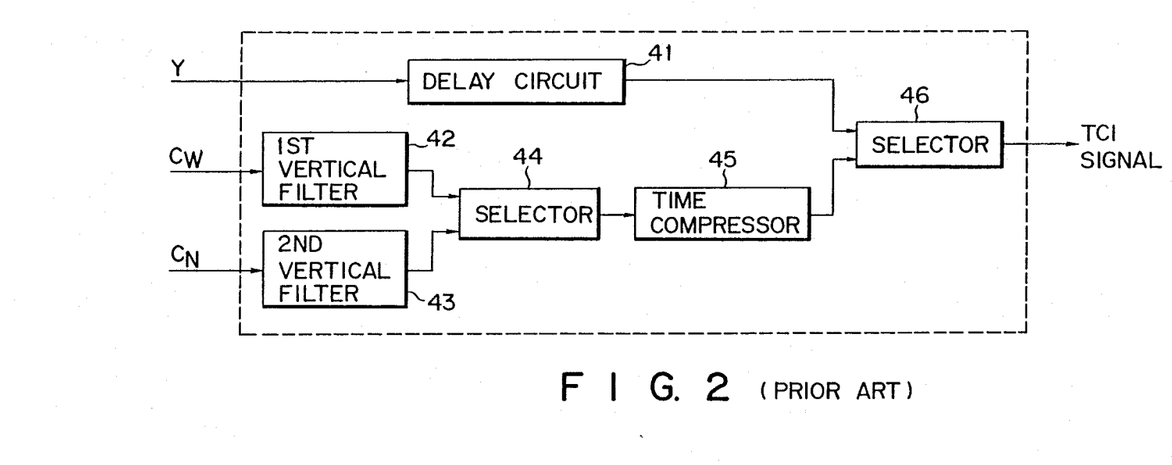
FIG. 2 is a block diagram showing a conventional TCI coder.

FIG. 2 shows a general arrangement of a conventional TCI coder. The Y signal is input to selector 46 through first phase compensation delay circuit 41 serving as a FIFO (First-in First-out). The $C_W$ and $C_N$ signals are input to selector 44 through first and second vertical filters 42 and 43. Outputs from vertical filters 42 and 43 are alternately selected by selector 44 every 1H. The output from selector 44 is compressed by time compressor 45, and the compressed signal is input to selector 46. Selector 46 selects the Y signal from delay circuit 41 during effective horizontal scanning period A within 1H and the time-compressed $C_W$ or $C_N$ signal during horizontal flyback period B, and the selected signals are combined in accordance with time compressed integration, thereby generating the TCI signal, as shown in FIG. 1D. Delay circuit 41 compensates for the delay time of the $C_W$ and $C_N$ signals by vertical filters 42 and 43 and makes the phases of the $C_W$ and $C_N$ signals coincide with that of the Y signal. More specifically, vertical filters 42 and 43 comprise tapped delay devices each with a plurality of taps for generating delayed signals having different delay times in response to an input signal, logic circuits, i.e., a plurality of multipliers for multiplying the tap outputs with a given coefficient, and an adder for adding outputs from the multipliers. In this case, if each vertical filter 42 or 43 comprises a tapped delay device with seven taps (0H, 1H, 2H, 3H, 4H, 5H, and 6H) including the tap for zero delay time, the $C_W$ and $C_N$ signals are delayed by 3H from the Y signal. Therefore, delay circuit 41 must comprise a memory having a capacity corresponding to the 3H Y signal data.

The TCI signal output from the TCI decoder is transmitted from the sending end to the receiving end through a transmission medium (transmission line or recording medium). At the receiving end, the Y, $C_W$, and $C_N$ signals are decoded by a decoder called a TCI decoder.

Figure 3:
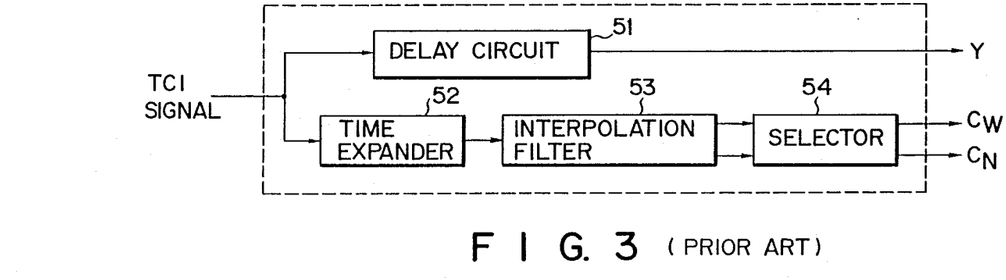
FIG. 3 is a block diagram showing a conventional TCI decoder.
Figure 4A:
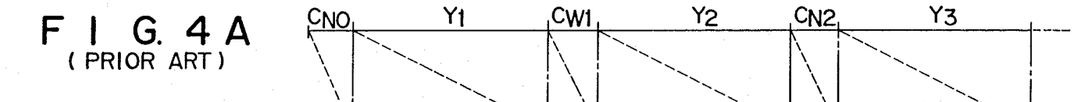
FIGS. 4A to 4F are timing charts for explaining a signal format in TCI signal processing at a receiving end.
Figure 4B:
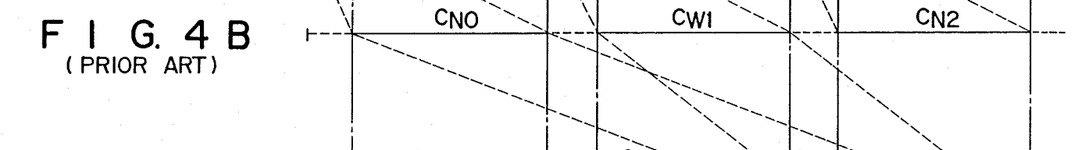
Figure 4C:
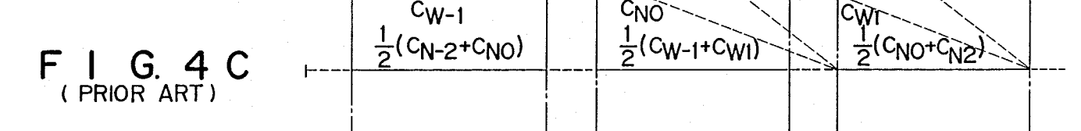
Figure 4D:
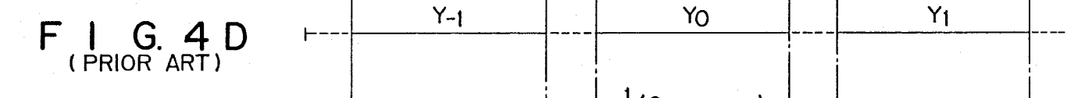
Figure 4E:
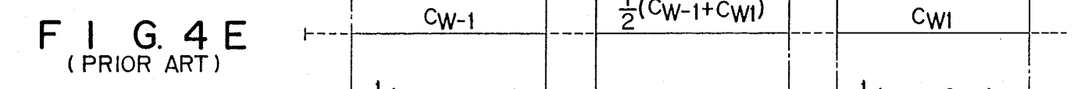
Figure 4F:
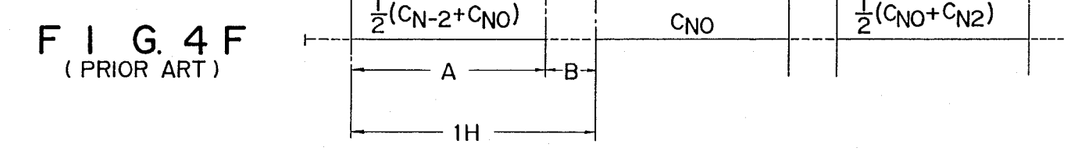

FIG. 3 shows a conventional arrangement of the TCI decoder. The Y signal component of the TCI signal is extracted as the Y signal output through second phase compensation delay circuit 51 as a FIFO memory. The $C_W$ and $C_N$ signal components are extracted as $C_W$ and $C_N$ signals through time compressor 52, interpolation filter 53, and selector 54. FIG. 4A shows the TCI signal transmitted to the receiving end, FIG. 4B shows the time-expanded $C_W$ and $C_N$ signals, and FIG. 4C shows the $C_W$ and $C_N$ signals interpolated by interpolation filter 53. FIGS. 4D to 4F show the Y, $C_W$, and $C_N$ signals output from the TCI decoder.

As shown in FIG. 1D, the $C_W$ and $C_N$ signal components in the TCI signal fall within the range of the original horizontal scanning period and are transmitted after the corresponding Y signal. For this reason, in order to make the phases of the $C_W$ and $C_N$ signals coincide with that of the Y signal, the Y signal must be delayed by 1H.

The $C_W$ and $C_N$ signals are transmitted in accordance with the line sequential scheme. For example, during the horizontal scanning period in which only the $C_W$ signal is transmitted, the $C_N$ signal must be generated within the corresponding period in the receiving end. The $C_N$ signal is generated at the receiving end by using the $C_N$ signals in the preceding and succeeding horizontal scanning periods to interpolate the $C_N$ signal within the present horizontal scanning period. The $C_W$ signal must be generated within the period corresponding to the horizontal scanning period in which the $C_N$ signal is transmitted. This $C_W$ signal can be generated by the same interpolation scheme as in the $C_N$ signal. Interpolation is performed by interpolation filter 53. Filter 53 comprises a tapped delayed device and logic circuits (multipliers and an adder) in the same manner as in vertical filters 42 and 43. In this case, one of the $C_W$ and $C_N$ signals which is not to be interpolated is delayed by 1H in interpolation filter 53 so that it may be in phase with the other. The $C_W$ and $C_N$ signals alternately appear at the output of interpolation filter 53 in accordance with the odd- and even-numbered horizontal scanning periods. The $C_W$ and $C_N$ signals appear at the corresponding output terminals by the action of selector 54 which is switched every 1H.

The signal expanded by time expander 52 will be taken into consideration. Interpolation of the $C_W$ or $C_N$ signal in interpolation filter 53 during each horizontal scanning period is equivalent to the following operation. By using $C_W$ and $C_N$ signals which are 2H ahead of a given horizontal scanning period, the $C_W$ and $C_N$ signals which are 1H adhead of the given period are interpolated and generated. The above operation imposes an additional operation at the receiving end. That is, in addition to 1H delay of the Y signal so as to make the $C_W$ and $C_N$ signals coincide with the Y signal at the receiving end, the Y signal must be further delayed by 1H. Therefore, delay circuit 51 must comprise a memory having a capacity corresponding to the 2H Y signal data.

The C signals (representing the $C_W$ and $C_N$ signals) are delayed by 3H in the coder and 2H in the decoder with respect to the Y signal. The total delay time of the Y signal by delay circuits 41 and 51 is 5H (in the above description, delay circuits 41 and 51 perform 3H and 2H delay operations, respectively. However, in practice, a ratio of delay time of the delay circuit 41 to that of delay circuit 51 can be arbitrarily determined since a total delay time of 5H is required).

Generally speaking, assume that m-tapped (m taps) vertical filters 42 and 43 are used and n-tapped (n taps) interpolation filter 53 is used. The C signals are delayed by $\{(m-1)/2\}H$ on the coder side and $[\{(n-1)/2\}+1]H$ on the decoder side. The Y signal must be delayed by $\}(m+n)/2\}H$ on the coder and decoder sides.

The TCI coder/decoder is often used in a system requiring both the coder and the decoder, such as a bidirectional TV transmission system, a recording/reproducing system (e.g. a VTR (Video Tape Recorder) and a video disc system). In such an application, it is desirable to mount the coder and decoder sections on a single LSI (Large Scale Integration) chip in order to reduce the number of circuit components. It is also desirable to selectively use it as a coder or decoder. If the coder and decoder which are shown in FIGS. 2 and 3 are mounted on a single LSI chip as independent circuits and are selectively used by a selector, the entire circuit size is greatly increased, and the number of elements constituting the circuit and the overall circuit area are increased. In particular, A memory (the 5H Y signal data which corresponds to the 20H C signal data) used for the phase compensation delay circuit for making the Y and C signals coincide with each other, a memory (the 12H C signal data) used as a delay device in the vertical filter, and a memory (the 2H C signal data) in the interpolation filter are required. The total capacity of these memory is large, which is a primary cause of a large circuit size. When the large coder/decoder is mounted on a single LSI chip, the yield and/or reliability of the LSIs is greatly degraded.

SUMMARY OF THE INVENTION

As described above, the conventional TCI coder/decoder is very large in size. When it is mounted on a single LSI chip, the number of elements and the area occupied by the elements are greatly increased, and hence the yield and reliability of the LSIs are undesirably degraded.

It is an object of the present invention to provide a coder/decoder for a time compressed integration system, wherein some circuit elements in a coder and a decoder are commonly used to effectively reduce the overall circuit size, thereby easily mounting the coder/decoder on a single LSI chip.

The coder/decoder for the time compressed integration system comprises a first memory section having a memory capacity capable of storing a luminance signal of at least one horizontal scanning period, a tapped second memory section having a memory capacity capable of storing wide- and narrow-band chrominance signals of a plurality of horizontal scanning periods, and a plurality of switching devices operated such that the first memory section serves as a first phase compensation delay circuit and one part of the second memory section serves as tapped delay devices in vertical filters in a coder mode, and the first memory section and one part of the second memory section serve as a second phase compensation delay circuit and the other part of the second memory section serves as a tapped delay device in an interpolation filter in a decoder mode.

According to the coder/decoder for the time compressed integration system, the entire first memory section and part of the second memory, that is, most of the memory area on the LSI chip, are commonly operated as the coder and the decoder. The overall circuit size of the TCI coder/decoder can be reduced. When the coder/decoder is mounted on the single LSI chip, the number of elements and the area occupied by the elements can be greatly reduced and hence the yield and reliability can be greatly improved.

DETAILED DESCRIPTION OF THE PREFERRED EMBODIMENT

Figure 5:
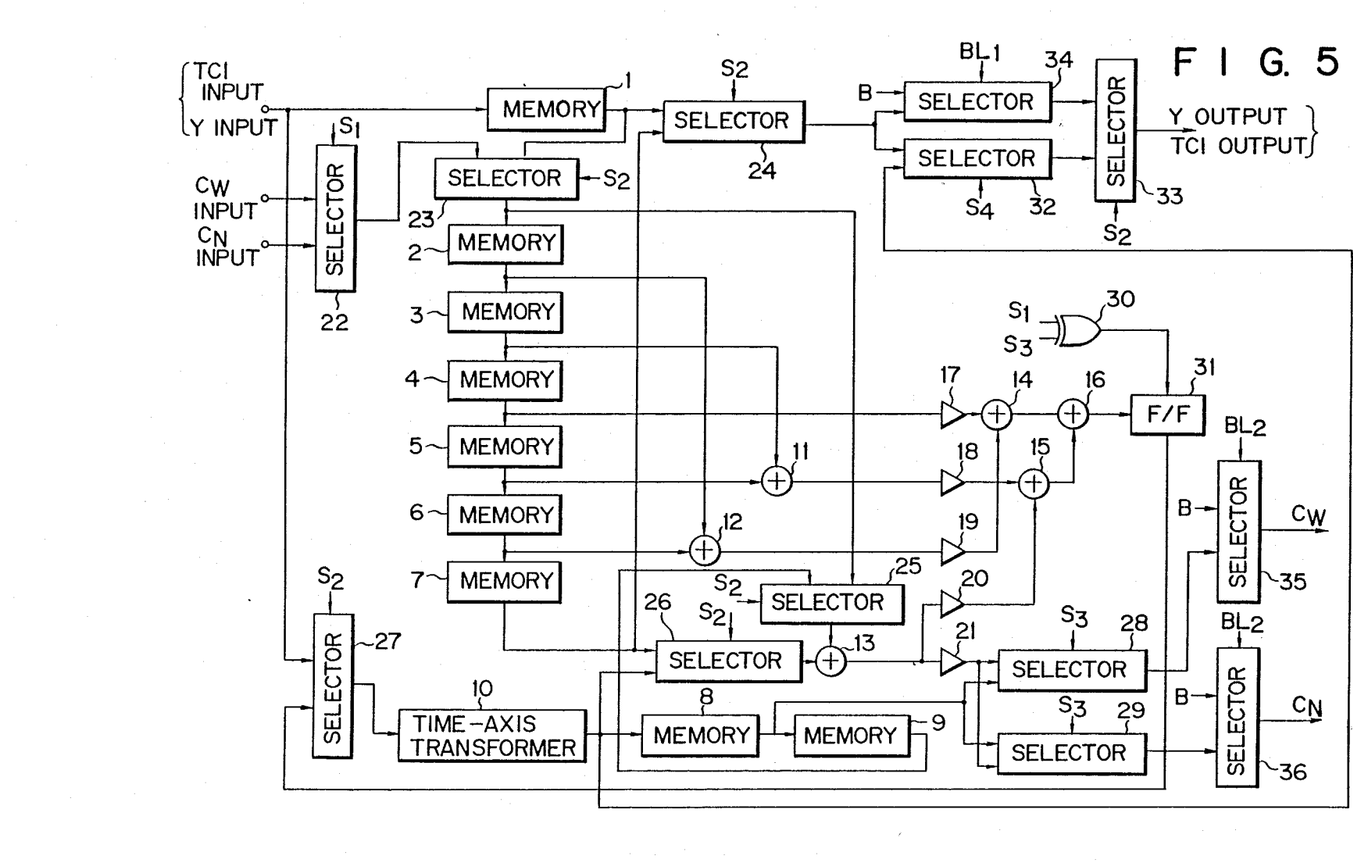
FIG. 5 is a block diagram of a TCI coder/decoder according to an embodiment of the present invention.

FIG. 5 shows an arrangement of a TCI coder/decoder according to an embodiment of the present invention. In the TCI coder/decoder shown in FIG. 5, a vertical filter having seven taps is used in the coder mode, and an interpolation filter having three tapes is used in the decoder mode. In the arrangement of FIG. 5, a time-compression coefficient of the C signals (CW and CN signals) in the coder mode is 4. In this case, the 1H Y signal data corresponds to 4H C signal data. A delay time given by the phase compensation delay circuit, which serves to make the Y and C signals in phase with each other, is 1H in the coder mode and 4H in the decoder mode, which is a total of 5H.

The TCI coder/decoder shown in FIG. 5 comprises first to ninth memories 1 to 9, time-axis transformer 10, adders 11 to 16, multipliers 17 to 21, selectors 22 to 29, selectors 32 to 36, exclusive OR gate 30, and flip-flop 31.

First memory 1 has a memory capacity corresponding to 1H Y signal data and is used as a first delay circuit. In both the coder and decoder modes, memory 1 is used as Y signal phase compensation delay circuits 41 and 51 shown in FIGS. 2 and 3.

Second to seventh memories 2 to 7 are connected in series with each other and have a memory capacity corresponding to the 2H C signal data. Similarly, eighth and ninth memories 8 and 9 are connected in series with each other and have a memory capacity corresponding to the 2H C signal data. Eighth and ninth memories 8 and 9 are used as the second tapped delay device. Of memories 2 to 9, second to seventh memories 2 to 7 are used as delay devices in the vertical filters (42 and 43) in the coder mode and as the second phase compensation delay circuit (51) together with first memory 1 in the decoder mode. Eighth and ninth memories 8 and 9 are used as a delay device in the interpolation filter (53) in the decoder mode.

Time-axis transformer 10 is used for time-axis expansion and comprises a memory having a memory capacity corresponding to the 1H C signal data. Transformer 10 is used as the time compressor (45) for the C signals in the coder mode and as the time expander (52) for the C signals in the decoder mode.

Memories 1 to 9 and time-axis transformer 10 are constituted by a FIFO memory of a RAM (Random Access Memory) or a dynamic shift register.

Adders 11 to 16 and multipliers 17 to 20 are used as logic circuits in the vertical filters (42 and 43) in the coder mode. Adder 13 and multiplier 21 are used as logic circuits in interpolation filter (53) in the decoder mode.

Selector 22 is used for time multiplex of the $C_W$ and $C_N$ signals. Selector 22 is switched in response to select signal S1 having the same frequency as the high-speed sampling frequency for deriving digital signals $C_W$ and $C_N$ shown in FIGS. 1B and 1C from an analog signal input from the TV camera. The $C_W$ and $C_N$ signals are alternately supplied to selector 23. For example, if select signal S1 is set at logic "1", the $C_W$ signal is fetched. When signal S1 is set at logic "0", the $C_N$ signal is fetched.

Selectors 23 to 27 are used to select the coder or decoder mode and is switched in response to select signal S2.

In the coder mode, the 1H $C_W$ and $C_N$ signals are stored in second to seventh memories 2 to 7 each having a capacity corresponding to the 2H C signal data.

Selectors 28 and 29 correspond to selector 54 in FIG. 3 and are switched in response to select signal S3 inverted in accordance with changes in even- and odd-numbered scanning lines. Selectors 28 and 29 are used to select the $C_W$ or $C_N$ signal output from interpolation filter 53 in the decoder mode.

Exclusive OR gate 30 which receives select signals S1 and S3 and flip-flop 31 constitute a line selector for outputting the $C_W$ and $C_N$ signals as the line sequential C signal outputs in the coder mode.

Assume that the $C_W$ signal is fetched when select signal S1 input to selector 22 is set at logic "1". If S1=S3="1", then an output from gate 30 is set at logic "0". The $C_W$ signal received by selector 22 is output from flip-flop 31. However, if S1=S3="0", then the $C_N$ signal is output from flip-flop 31.

More specifically, selector 22 samples alternately the $C_W$ signal and the $C_N$ signal in response to select signal S1, and each sampling data of the $C_W$ and $C_N$ signals is stored in memories 2 to 7 successively. In other words, in memories 2 to 7, sampling data of the $C_W$ signal and sampling data of the $C_N$ signal are disposed alternately. As a whole, 2H C signal data consisting of 1H $C_W$ signal sampling data and 1H $C_N$ signal sampling data is stored in the memories. For example, when $C_W$ signal sampling data is input to memory 2, the data sampled 2H before, i.e., the $C_W$ signal sampling data sampled 1H before is output from memory 2, and the data sampled 4H before, i.e., the $C_W$ signal sampling data sampled 2H before is outut from memory 3. Meanwhile, $C_W$ signal sampling data is also output from 4 to 7 in the same manner. Hence, in this case, signals input to or output from adders 11 to 16 can be sampling or resulting data of the $C_W$ signal. Similarly, for example, when $C_N$ signal sampling data is input to memory 2, signals, input to or output from adders 11 to 16 can be sampling data of the $C_N$ signal. Assuming that select signal S3 is "0" during the period of scanning even-numbered lines, and "1" during the period of scanning odd-numbered lines. Under these conditions, while select signal S3 is "1", i.e., while the odd-numbered lines are scanned, gate 30 outputs "0" corresponding to the timing when signal S1 is "1", and flip-flop 31 is enabled. As a result, only the $C_W$ signal data output form adder 16 corresponding to the above timing is output from flip-flop 31. On the other hand, while select signal S3 is "0", i.e., while the even-numbered lines are scanned, gate 30 outputs "0" and flip-flop 31 is enabled correposnding to the timing when signal S1 is "0". As a result, only the $C_N$ signal data output from adder 16 in accordance with the above timing is output from flip-flop 31.

Selector 32 selects the Y signal or the time-compressed C signals in the effective horizontal scanning period and the horizontal flyback period in response to select signal S4. Selector 33 outputs the TCI signal in the coder mode and the Y signal in the decoder mode in response to select signal S2.

Selector 34 is used in the decoder mode and outputs black level signal B in the Y signal output during the flyback period in response to blanking signal BL1. Selectors 35 and 36 are used in the decoder mode and output black level signal B in the $C_W$ and $C_N$ signal outputs in the flyback period in response to blanking signal BL2.

The operations of the coder/decoder shown in FIG. 5 in the coder and decoder modes will be described below.

Figure 6:
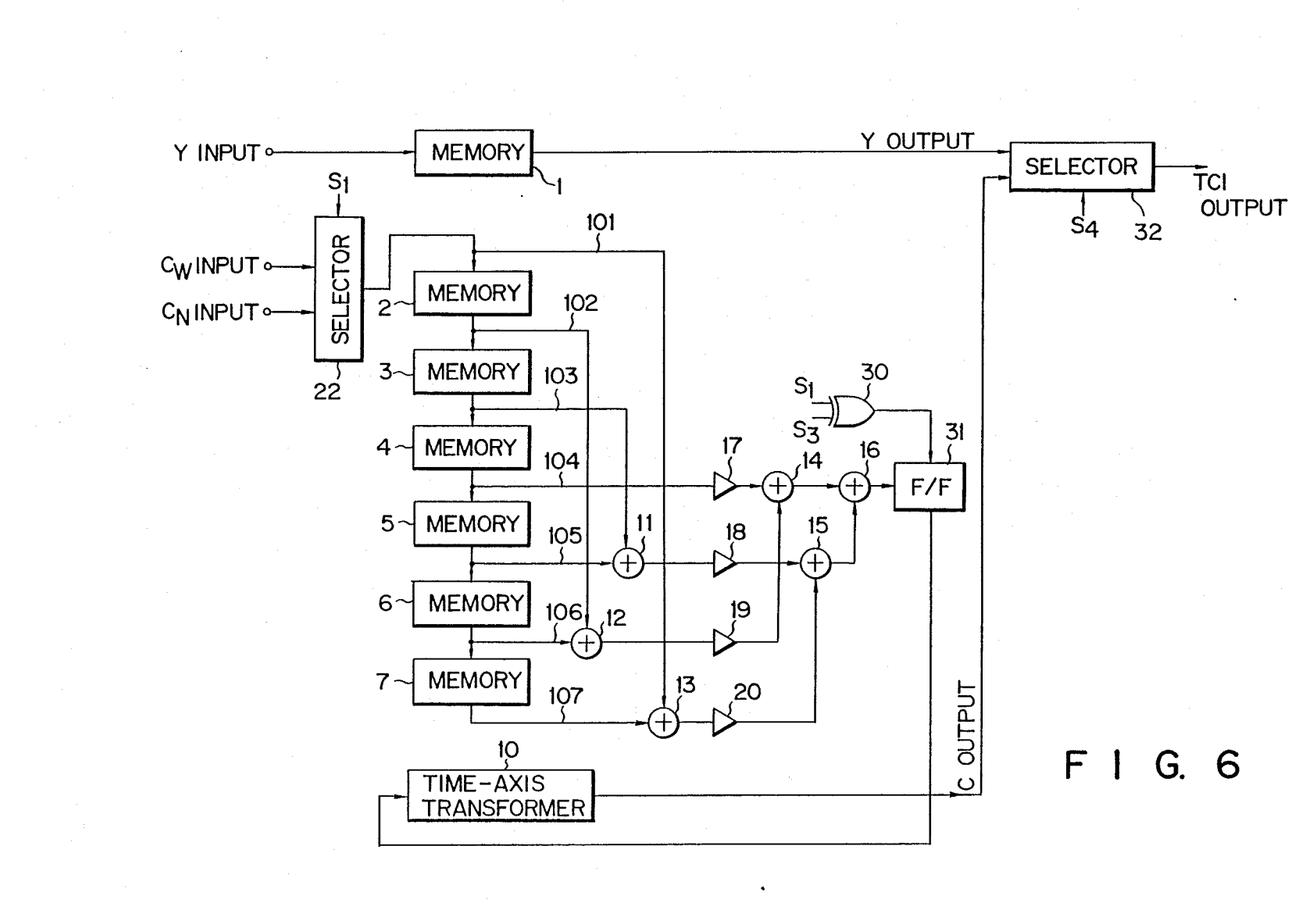
FIG. 6 is a block diagram showing an effective arrangement in a coder mode of the TCI coder/decoder in FIG. 5.
Figure 7:
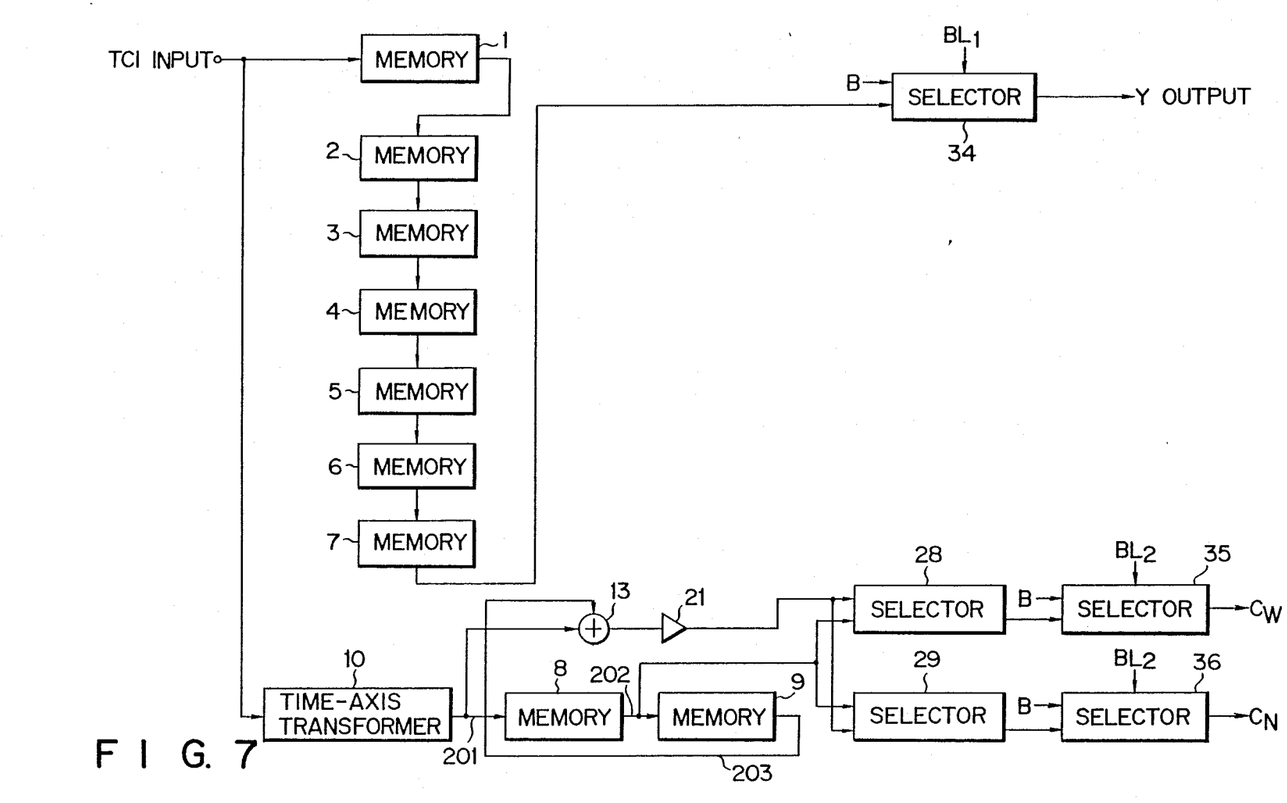
FIG. 7 is a block diagram showing an effective arrangement in a decoder mode of the TCI coder/decoder in FIG. 5.

FIGS. 6 and 7 show operations in the coder and decoder modes, respectively. For illustrative convenience, a selector (not shown) used in a state wherein one input terminal is normally connected to one output terminal in the coder or decoder mode is represented by a simple electrical connection. In addition, the circuit elements which are substantially disconnected from the coder or decoder and do not influence the operations in the corresponding mode are not illustrated in FIGS. 6 and 7.

In the coder mode shown in FIG. 6, the $C_W$ and $C_N$ signals are subjected to time multiplexing by selector 22, and the resultant signals having doubled data rates are serially input to second to seventh memories 2 to 7. In this case, seven tap outputs 101 to 107 from memories 2 to 7 correspond to the present $C_W$ and $C_N$ signals, the $C_W$ and $C_N$ signals which are 1H ahead of the present signals, the $C_W$ and $C_N$ signals which are 2H ahead of the present signals, ... the $C_W$ and $C_N$ signals which are 6H ahead of the present signals, respectively. The present signals and the signals which are 6H ahead of them, the signals which are 1H and 5H ahead of the present signals, and the signals which are 2H and 4H ahead of the present signals are added by adders 13, 12, and 11, respectively. Sums from adders 13, 12, and 11 are multiplied with coefficients by multipliers 20, 19, and 18. Multipliers 20, 19, and 18 multiply predetermined coefficients with the input signals and output products. Adders 14 to 16 add outputs from multipliers 20, 19, and 18 and the signals which are output from multiplier 17 are 3H ahead of the present signals. In this manner, the TCI C signals derived from the $C_W$ and $C_N$ signals are filtered by a vertical filter comprising memories 2 to 7, adders 11 to 16, and multipliers 17 to 20. The C signals filtered in the vertical direction, that is, the $C_W$ and $C_N$ signals, are selected by flip-flop 31 in accordance with the odd- and even-numbered scanning lines. The $C_W$ or $C_N$ signal output from flip-flop 31 is time-compressed by time-axis transformer 10 and serves as the C signal output.

The Y signal is delayed by memory 1 having a memory capacity corresponding to the 1H Y signal data and serves as the Y signal output. These Y and C signal outputs are subjected to time compressed integration by selector 32, and the TCI signal appears.

Memories 8 and 9, multiplier 21, and selectors 28 and 29 shown in FIG. 5 are not used in the coder mode.

In the decoder mode shown in FIG. 7, the TCI signal as an input to the decoder is input to 1H Y signal data memory 1. In this case, the output terminal of memory 1 is connected to the input terminal of first memory 2 of memories 2 to 7 by selector 23 shown in FIG. 5. An output from last memory 7 of memories 2 to 7 is extracted by selector 24 (FIG. 5) as the Y signal output. Therefore, the Y signal is delayed by the 4H period as a sum of the 1H period of memory 1 and the 12H periods of the C signals (=3H period of the Y signal). The flyback period of the Y signal output through selector 24 is set at black level by selector 34.

The C signal components in the TCI signal as an input to the decoder are input to time-axis transformer 10 and expanded along the time axis. During the output period of the expanded C signals, the Y signal component in the TCI signal is not input. Memories 8 and 9 constitute a delay device in interpolation filter 52. Three tap outputs 201 to 203 from the delay device correspond to the present signals, signals which are 1H ahead of them, and signals which are 2H ahead of the present signals, respectively. Outputs 201 to 203 are multiplied with a coefficient by multiplier 21. Output signals from multiplier 21 serve as signals to be interpolated during a period corresponding to the signals which are 1H ahead of the present signals.

The $C_W$ and $C_N$ signals are transmitted in accordance with the line sequential scheme. For example, if the interpolation signal generated by the present signal and the signal which is 2H ahead of it is the $C_W$ signal, the signal 1H ahead of the present signal corresponds to the $C_N$ signal. However, if the interpolation signal generated by the present signal and the signal 2H ahead of it is the $C_N$ signal, the signal 1H ahead of the present signal corresponds to the $C_W$ signal. This correspondence is changed every 1H. The interpolation signal generated by the present signal and the signal 2H ahead of it is output parallel to the signal 1H ahead of the present signal (i.e., second tap output 202). The parallel outputs are input to selectors 28 and 29. The interpolation signal and the signal 1H ahead of the present signal are selectively switched by selectors 28 and 29. Selector 28 always outputs the $C_W$ signal selector 29 always outputs the $C_N$ signal. The flyback periods of the $C_W$ and $C_N$ signal outputs through selectors 28 and 29 are set at black level by selectors 35 and 36.

In the decoder mode, adders 11, 12, 14 to 16, multipliers 17 to 20, selector 22, exclusive OR gate 30, and flip-flop 31 shown in FIG. 5 are not used.

When the TCI coder/decoder shown in FIG. 5 is operated in the coder mode shown in FIG. 6 to use it at the sending or recording end or in the decoder mode to use it at the receiving or reproducing end, the C signals are delayed by 3H on the coder side and 2H on the decoder side, i.e., a total of 5H. The Y signal is delayed by 1H on the coder side and 4H on the decoder side, i.e., a total of 5H. The Y and C signals as outputs from the decoder are in phase.

With the arrangement of FIG. 5, all memories excluding memories 8 and 9 each having a memory capacity corresponding to the 1H C signal data are commonly used in the coder and decoder modes. As compared with the independent coder and decoder, the overall circuit size can be greatly decreased and the coder/decoder can be effectively formed on a single LSI chip. In the embodiment shown in FIG. 5, adder 13 of the logic circuits in addition to the memories is commonly used in the coder and decoder modes, thus further reducing the circuit size. When identical coefficients are used in multipliers 20 and 21 or different coefficients are used in the coder and decoder modes, a single multiplier serves as multipliers 20 and 21.

The present invention is exemplified by the arrangement shown in FIG. 5. However, the above embodiment will be generalized as follows.

Symbols are defined below:

m: the number of taps of the vertical filter (odd number)

n: the number of taps of the interpolation filter (odd number)

k: the ratio of the Y signal data to the C signal data within 1H (i.e., the 1H Y signal data corresponds to kH C signal data)

α: the value obtained such that the number of memories commonly used in the first and second phase compensation delay circuits in the coder and decoder modes is expressed by the number (natural number) of memories for 1H Y signal data, wherein $\alpha = \{(k/2-2)m + (k/2+1)n + 1 - \beta\}/(2k)$ β: the value obtained such that the number of C signal memories used in the decoder mode but not in the coder mode is expressed by the number (integer) of memories for the 1H C signal data. If this value is negative, the value represents the number of 1H C memories used in the coder mode but not in the decoder mode.

In the TCI coder/decoder of the present invention, the memory (corresponding to memory 1 in FIG. 5) of the αH Y signal data and a memory (corresponding to memories 2 to 9 in FIG. 5) of the $\{2(m-1)+\beta\}$H C signal data are prepared. The H Y memory is commonly used in the coder and decoder modes.

If $\alpha > n-1$, then the $2(m-1)$H C signal data memory is commonly used in the delay device in the vertical filter in the coder mode and the phase compensation delay circuit in the decoder mode. However, if $\alpha \leq n-1$, then the $\{2(m-1)-(n-1)+\beta\}$H C signal data memory (corresponding to memories 2 to 7 in FIG. 5) is commonly used in the above circuit components.

More specifically, in the coder mode, only the αH Y signal data memory (corresponding to memory 1 in FIG. 5) is used as the first phase compensation delay circuit (41), and the $2(m-1)$H C signal data memory (corresponding to memories 2 to 7 in FIG. 5) of the $\{2(m-1)+\beta\}$H C signal data memory is used as the delay means in the vertical filter.

In the decoder mode, the αH Y signal data memory (corresponding to memory 1 in FIG. 5) and the $\{2(m-1)-(n-1)+\beta\}$H C signal memory portion (corresponding to memories 2 to 7 in FIG. 5) of the $\{2(m-1+\beta\}$H C signal data memory are used as the second phase compensation delay circuit (51). The $(n-1)$H C signal data memory portion of the $\{2(m-1)+\beta\}$H C signal data memory is used as the delay device in the interpolation filter (52).

When the memory areas operated in the coder and decoder modes are paired at the sending or receiving end, the Y signal is delayed by $\{(m+n)/2\}$H in both the coder and decoder modes, thereby making the phases of the Y and C signals coincide with each other. In this case, the memory which is not commonly used in the coder and decoder modes is only a βH C signal data memory.

What is claimed is:

1. A coder/decoder for a time compressed integration selectively used in a coder mode or a decoder mode and arranged such that a coder and a decoder are substantially mounted on a single integrated circuit chip, said coder comprising a first phase compensation delay circuit for delaying a luminance signal, vertical filters for limiting frequency bands of wide- and narrow-band chrominance signals in a vertical direction, each of said vertical filters being provided with tapped delay means and logic circuit means connected to taps of said tapped delay means, and means for alternately extracting outputs from said vertical filters every horizontal scanning period and performing time-axis compression, said coder being arranged to perform time compressed integration of the compressed wide- and narrow-band chrominance signals and the luminance signal having passed through said first phase compensation delay circuit and to output a time compressed integration signal, said decoder comprising a second phase compensation delay circuit for delaying the luminance signal in the time compressed integration signal, means for expanding the wide- and narrow-band chrominance signals in the time compressed integration signal, and an interpolation filter for interpolating the wide- and narrow-band chrominance signals during periods of the expanded wide- and narrow-band chrominance signals, said interpolation filter being provided with tapped delay means and logic circuit means connected to taps of said tapped delay means, and said decoder being arranged to obtain an original luminance signal and original wide- and narrow-band chrominance signals, comprising:

first memory means having a memory capacity corresponding to the luminance signal of at least one horizontal scanning period;

second memory means with taps having a memory capacity corresponding to the wide- and narrow-band chrominance signals of a plurality of horizontal scanning periods; and a plurality of switching means operated such that said first memory means serves as said first phase compensation delay circuit and one part of said second memory means serves as said tapped delay means in said vertical filters in the coder mode, and said first memory means and said one part of said second memory means serve as said second phase compensation delay means and the other part of said second memory means serves as said tapped delay means in said interpolation filter in the decoder mode.

2. A coder/decoder according to claim 1, wherein said switching means includes switching means for causing some of said logic circuit means used as part of said vertical filters in the coder mode to serve as part of said vertical filters in the coder mode and as part of said interpolation filter in the decoder mode.

3. A coder/decoder according to claim 1, wherein said first and second memory means comprise FIFO memories, respectively.

4. A coder/decoder according to claim 1, wherein said first memory means has a memory capacity corresponding to an α·H luminance signal component wherein $\alpha = \{(k/2-2)m + (k/2+1)n + 1 - \beta\}/(2k)$ where m (odd number) is the number of taps of each of said vertical filters, n (odd number) is the number of taps of said interpolation filter, H is a horizontal scanning period, and k is a ratio of a data volume of the luminance signal to that of the wide- and narrow-band chrominance signals within 1H, said second memory means has a memory capacity corresponding to $\{2(m-1)+\beta\}$H (where β is an integer) wide- and narrow-band chrominance signal components, if $\alpha > n-1$, then a memory of $2(m-1)$H wide- and narrow-band chrominance signal components is commonly used as said tapped delayed means in said vertical filters in the coder mode and said second phase compensation delay circuit in the decoder mode, and if $\alpha \leq n-1$, then a memory of $\{2(m-1)-(n-1)+\beta\}$H wide- and narrow-band chrominance signal components is commonly used as said delay means in said vertical filters in the coder mode and said second phase compensation delay circuit in the decoder mode.

5. A coder/decoder for a time compressed integration system, comprising:

first memory means having a memory capacity corresponding to a luminance signal of at least one horizontal scanning period, said first memory being used as a first phase compensation delay circuit for delaying the luminance signal in a coder mode and being used as part of a second phase compensation delay circuit for delaying the luminance signal in a time compressed integration signal in a decoder mode;

second memory means having a memory capacity corresponding to wide- and narrow-band chrominance signals of a plurality of horizontal scanning periods, said second memory being partially used as tapped delay means constituting part of vertical filters in the coder mode, said vertical filters being arranged to limit frequency bands of the wide- and narrow-band chrominance signals in a vertical direction, and one part of said second memory being used as a remaining portion of said second phase compensation delay circuit and the other part thereof being used as tapped delay means constituting part of an interpolation filter in the decoder mode, said interpolation filter being arranged to interpolate the narrow- and wide-band chrominance signals in periods of expanded wide- and narrow-band chrominance signals;

means for alternately time-compressing outputs from said vertical filters every horizontal scanning period in the coder mode and for expanding the wide- and narrow-band chrominance signals in a time compressed integration signal in the decoder mode;

arithmetic operating means connected to taps of said tapped delay means to constitute said vertical filters in the coder mode and connected to taps of said tapped delay means to constitute said interpolation filter in the decoder mode; and a plurality of switching means operated such that said first memory means serves as said first phase compensation delay circuit and one part of said second memory means serves as said tapped delay means in said vertical filters in the coder mode, and said first memory means and said one part of said second memory means serve as said second phase compensation delay means and the other part of said second memory means serves as said tapped delay means in said interpolation filter in the decoder mode.

6. A coder/decoder according to claim 5, wherein said switching means includes switching means for causing some of said arithmetic operating means used as part of said vertical filters in the coder mode to serve as part of said vertical filters in the coder mode and as part of said interpolation filter in the decoder mode.

7. A coder/decoder according to claim 5, wherein said first and second memory means comprise FIFO memories, respectively.

8. A coder/decoder according to claim 5, wherein said time-compressing/expanding means comprises a FIFO memory.

9. A coder/decoder according to claim 5, wherein said first memory means has a memory capacity corresponding to an $\alpha \cdot H$ luminance signal component wherein $\alpha = \{k/2 - 2)m + (k/2 + 1)n + 1 - \beta\}/(2k)$ where m (odd number) is the number of taps of each of said vertical filters, n (odd number) is the number of taps of said interpolation filter, H is a horizontal scanning period, and k is a ratio of a data volume of the luminance signal to that of the wide- and narrow-band chrominance signals within 1H, said second memory means has a memory capacity corresponding to $\{2(m-1)+\beta\}H$ (where $\beta$ is an integer) wide- and narrow-band chrominance signal components, if $\alpha > n - 1$, then a memory of $2(m-1)H$ wide- and narrow-band chrominance signal components is commonly used as said tapped delayed means in said vertical filters in the coder mode and said second phase compensation delay circuit in the decoder mode, and if $\alpha \leq n-1$, then a memory of $\{2(m-1)-(n-1)+\beta\}H$ wide- and narrow-band chrominance signal components is commonly used as said delay means in said vertical filters in the coder mode and said second phase compensation delay circuit in the decoder mode.

* * * * *